United States Patent
Sakamoto

Patent Number: 5,865,506
Date of Patent: Feb. 2, 1999

[54] VEHICLE SEAT LOCK MECHANISM

[75] Inventor: Yutaka Sakamoto, Hiroshima-ken, Japan

[73] Assignee: Delta Kogyo Co., Ltd., Hiroshima-ken, Japan

[21] Appl. No.: 990,528

[22] Filed: Dec. 15, 1997

Related U.S. Application Data

[62] Division of Ser. No. 490,695, Jun. 16, 1995, Pat. No. 5,727,768.

[30] Foreign Application Priority Data

Jun. 20, 1994 [JP] Japan .................................. 6-136959
May 10, 1995 [JP] Japan .................................. 7-111789

[51] Int. Cl.⁶ .................................................. B60N 2/08
[52] U.S. Cl. ...................................... 297/362.14; 248/429
[58] Field of Search .................................. 248/423, 424, 248/429, 900; 297/362.14, 362.11, 362.12; 296/63, 64, 65.1

[56] References Cited

U.S. PATENT DOCUMENTS

| | | |
|---|---|---|
| 1,088,248 | 2/1914 | Via . |
| 3,076,629 | 2/1963 | Henry-Biabaud . |
| 3,858,934 | 1/1975 | Eggert, Jr. . |
| 4,225,177 | 9/1980 | Klüting . |
| 4,664,442 | 5/1987 | Stolper et al. . |
| 4,721,337 | 1/1988 | Tomita . |
| 4,781,354 | 11/1988 | Nihei et al. . |
| 4,799,734 | 1/1989 | Périou . |
| 4,838,511 | 6/1989 | Terada et al. . |
| 4,969,621 | 11/1990 | Münchow et al. . |
| 5,125,611 | 6/1992 | Cox . |
| 5,150,872 | 9/1992 | Isomura . |
| 5,259,257 | 11/1993 | Mouri . |
| 5,273,242 | 12/1993 | Mouri et al. . |
| 5,280,999 | 1/1994 | Jones et al. .................... 297/362.14 X |
| 5,314,158 | 5/1994 | Mouri . |
| 5,447,352 | 9/1995 | Ito et al. . |
| 5,556,165 | 9/1996 | Pickles ............................... 297/362.14 |
| 5,707,112 | 1/1998 | Zinn ............................... 297/362.14 X |
| 5,727,768 | 3/1998 | Sakamoto ................................ 248/429 |

FOREIGN PATENT DOCUMENTS

| | | |
|---|---|---|
| 1363716 | 5/1964 | France .............................. 297/362.14 |
| 19 09 492 | 9/1969 | Germany . |
| 27 13 973 | 10/1978 | Germany . |
| 32 39 682 | 5/1984 | Germany . |
| 367105 | 1/1939 | Italy .................................. 297/362.14 |
| 60-166537 | 8/1985 | Japan . |
| 63-235136 | 9/1988 | Japan . |
| 2-143332 | 12/1990 | Japan . |
| 1327276 | 8/1973 | United Kingdom .............. 297/362.14 |
| 94/22692 | 10/1994 | WIPO . |

Primary Examiner—Ramon O. Ramirez
Assistant Examiner—Long Dinh Phan
Attorney, Agent, or Firm—Wenderoth, Lind & Ponack, L.L.P.

[57] ABSTRACT

An automotive vehicle includes a lock mechanism for locking a seat slide unit on which a vehicle seat is mounted or a seat reclining unit mounted on the vehicle seat. A screw rotatably mounted on an upper rail is in mesh with a nut secured to a lower rail or mounted on a seat back frame. Each of the screw and the nut has a lead angle greater than an angle of friction thereof so that the screw can rotate in response to a load applied to the vehicle seat or a seat back, thus enabling adjustment of the position of the vehicle seat in a direction longitudinally of the vehicle body or that of the angle of inclination of the seat back. If deceleration or acceleration of a value not smaller than a predetermined value is applied to the vehicle seat, the screw is urgently locked to thereby maintain the current position of the vehicle seat or the current angle of inclination of the seat back.

6 Claims, 8 Drawing Sheets

VEHICLE SEAT LOCK MECHANISM

This is a division of Ser. No. 08/490,695, filed Jun. 16, 1995 now U.S. Pat. No. 5,727,768.

BACKGROUND OF THE INVENTION

1. Field of the Invention

The present invention relates generally to a vehicle seat lock mechanism for locking a seat slide unit on which a vehicle seat is mounted or a seat reclining unit mounted on the vehicle seat and, more particularly, to a vehicle seat lock mechanism for securely locking a seat or a seat back when a great deceleration or acceleration is applied to the seat due to a vehicle collision or the like while the position of the seat or the angle of inclination of the seat back is being adjusted.

2. Description of Related Art

As a conventional seat slide unit, Japanese Patent Publication (examined) No. 62-61462 discloses a seat slide adjuster capable of adjusting the position of a seat step by step. This adjuster is intended to slide the seat by alternately engaging two lock plates with a plurality of latches of a latch plate. During a seat sliding operation, one of the lock plates is engaged with any one of the plurality of latches at all times.

Japanese Utility Model Publication (examined) No. 62-42834 discloses a seat slide unit for locking a seat by utilizing an inertial force. The seat slide unit is implemented by two independent lock portions disposed on respective sides of the seat. One of the lock portions is of a manual locking type for use in a normal seat sliding operation, while the other is of an inertial locking type for automatically locking the seat when an abrupt deceleration or acceleration is generated due to a vehicle collision or the like.

Japanese Utility Model Publication (examined) No. 63-46258 discloses a lock unit for locking a seat slide unit, wherein inclined surfaces is formed forwardly and rearwardly of a lock hole, thereby allowing a lock plate to be easily introduced into the lock hole.

On the other hand, a conventional seat reclining unit is intended to properly adjust the angle of inclination of a seat back generally by manually releasing engagement of a lock gear with a sector gear fixed to a seat back frame or by electrically swinging the sector gear.

Of the above-described conventional seat slide units, the seat slide adjuster disclosed in Japanese Patent Publication No. 62-61462 is required to move the seat by operating an operating lever pitch by pitch, resulting in a troublesome operation of the operating lever and much time required for moving the seat.

The seat slide unit disclosed in Japanese Utility Model Publication No. 62-42834 is of a structure in which the lock plate is immediately locked by operation of a deceleration/acceleration sensor. This sensor is, however, ineffective when the lock lever is being operated.

The lock unit disclosed in Japanese Utility Model Publication No. 63-46258 does not guarantee that the lock plate be positively introduced into the lock hole along an inclined surface when deceleration or acceleration is applied to the seat while the position of the seat is being adjusted.

On the other hand, particularly in the manually-operated one of the seat reclining units, the seat back has been abruptly tilted forwards or backwards when deceleration or acceleration is applied to the seat during operation of the operating lever.

SUMMARY OF THE INVENTION

The present invention has been developed to overcome the above-described disadvantages.

It is accordingly an objective of the present invention to provide a lock mechanism capable of securely locking a seat or a seat back even when a great deceleration or acceleration is applied to the seat due to a vehicle collision or the like while an operating lever is being operated to slide the seat or tilt the seat back.

In accomplishing the above and other objectives, the lock mechanism according to one form of the present invention is capable of locking a seat slide unit having a first member secured to a vehicle body and a second member slidably mounted on the first member with a vehicle seat fixedly mounted on the second member. The lock mechanism comprises a screw rotatably mounted on the second member and extending in parallel therewith, and a nut secured to the first member and being in mesh with the screw. Each of the screw and the nut has a lead angle greater than an angle of friction thereof so that the screw rotates in response to a load applied to the second member, to thereby allow the second member to slide relative to the first member. The lock mechanism also comprises an emergency lock means for locking the screw in response to deceleration or acceleration of a value not smaller than a predetermined value applied to the vehicle seat.

Conveniently, the lock mechanism further comprises first and second casings secured to the second member for rotatably supporting first and second ends of the screw, respectively. In this case, the emergency lock means comprises the first casing and a disk secured to the first end of the screw and rotatably accommodated in the first casing. Each of the first and second casings has a space defined therein to allow the screw to move in a direction axially thereof. The first casing also has inner walls with one of which the disk is brought into frictional contact upon application of said deceleration or acceleration, to thereby lock the screw.

Advantageously, the lock mechanism also comprises an elastic means accommodated in the space, wherein the predetermined value can be changed by adjusting an elastic force of the elastic means from outside.

Conveniently, the lock mechanism further comprises a lock member pivotally mounted on the second member, an operating lever pivotally mounted on the second member, and a cam securely mounted on the operating lever for rotation together therewith, whereby operation of the operating lever causes the cam to press the lock member against the disk to thereby lock the screw.

Alternatively, the emergency lock means comprises a pair of inertial lock members slidably accommodated within the first casing and a disk secured to the first end of the screw and rotatably accommodated in the first casing. In this case, the disk is disposed so as to confront the pair of inertial lock members in a spaced relationship so that the disk is brought into frictional contact with one of the pair of inertial lock members upon application of said deceleration or acceleration, to thereby lock the screw.

In another form of the present invention, the lock mechanism is designed to lock a seat slide unit having a lower rail secured to a vehicle body and an upper rail slidably mounted on the lower rail with a vehicle seat fixedly mounted on the upper rail. This lock mechanism comprises a manual lock unit and an emergency lock unit juxtaposed with each other. The manual lock unit comprises an operating lever rotatably mounted on the upper rail, a lock member fixedly mounted on the operating lever for rotation together therewith, and a latch plate secured to the lower rail and engageable with the lock member to lock the vehicle seat. On the other hand, the emergency lock unit comprises a screw rotatably mounted on the upper rail and extending in parallel therewith, and a nut secured to the lower rail and being in mesh with the screw. Each of the screw and the nut has a lead angle greater than an angle of friction thereof so that the screw rotates in response to a load applied to the vehicle seat, to thereby allow the upper rail to slide relative to the lower rail. The emergency lock unit also comprises an emergency lock means for locking the screw in response to deceleration or acceleration of a value not smaller than a predetermined value applied to the vehicle seat.

In a further form of the present invention, the lock mechanism is designed to lock a seat reclining unit mounted on a vehicle seat having a seat cushion frame and a seat back frame. The seat reclining unit has a first member secured to the seat back frame. The vehicle seat is fixedly mounted on a second member slidably mounted on a vehicle body. The lock mechanism comprises a screw rotatably mounted on the second member and extending in parallel therewith, an arm pivotally mounted on the seat cushion frame and having first and second ends opposite to each other with the first end of the arm secured to the first member, and a nut mounted on the second end of the arm and being in mesh with the screw. Each of the screw and the nut has a lead angle greater than an angle of friction thereof so that the screw rotates in response to a load applied to the first member, to thereby allow the first member to move relative to the second member. The lock mechanism also comprises an emergency lock means for locking the screw in response to deceleration or acceleration of a value not smaller than a predetermined value applied to the vehicle seat.

Since the screw and the nut are made to have a lead angle greater than the angle of friction thereof, the screw rotates when a load is applied to either the first member or the second member, allowing one of the first member and the second member to move relative to the other. When deceleration or acceleration of a value not smaller than the predetermined value is applied to the seat, the screw is locked by the emergency lock means.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
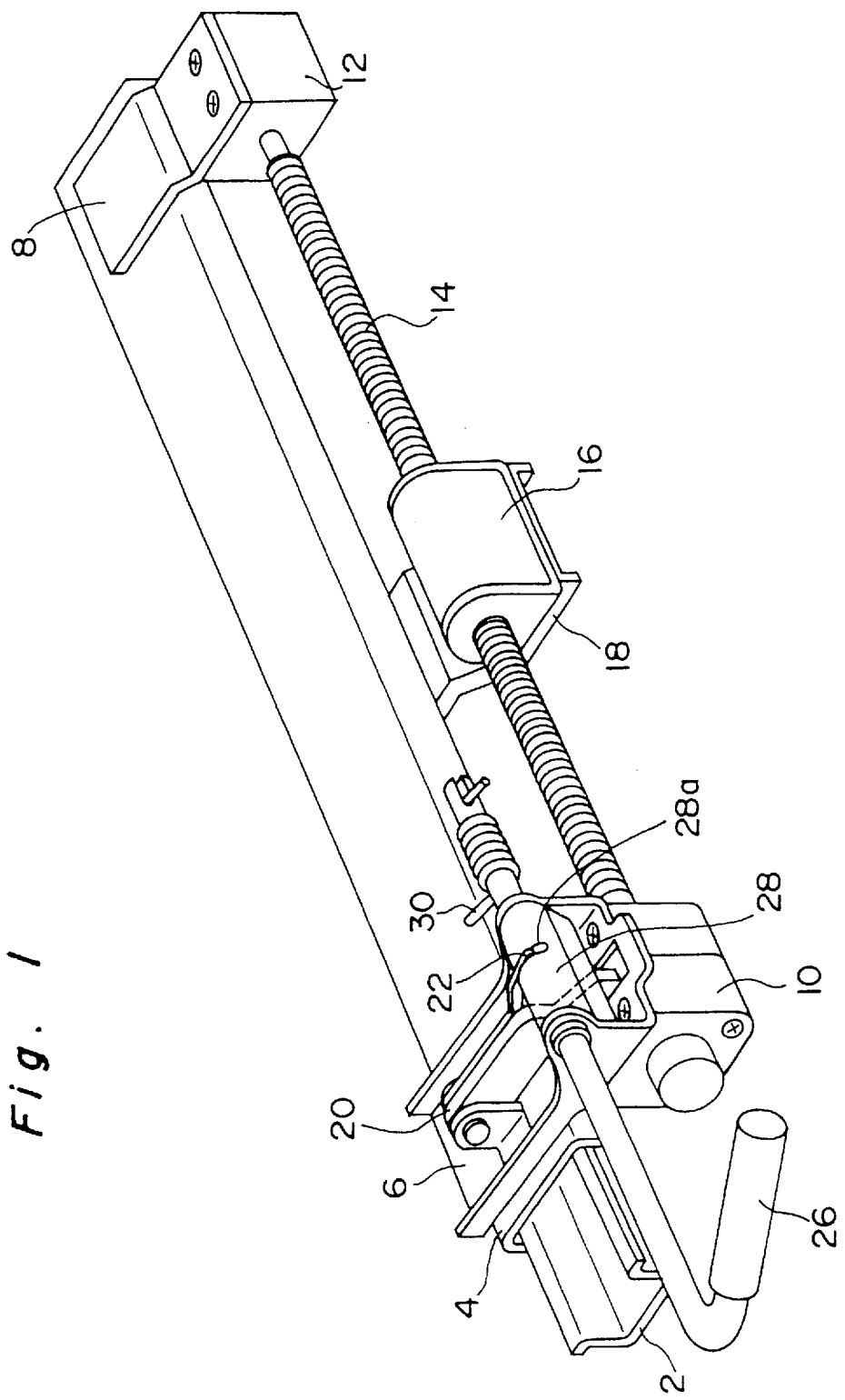
FIG. 1 is a perspective view of a seat slide unit provided with a lock mechanism according to a first embodiment of the present invention.
Figure 2:
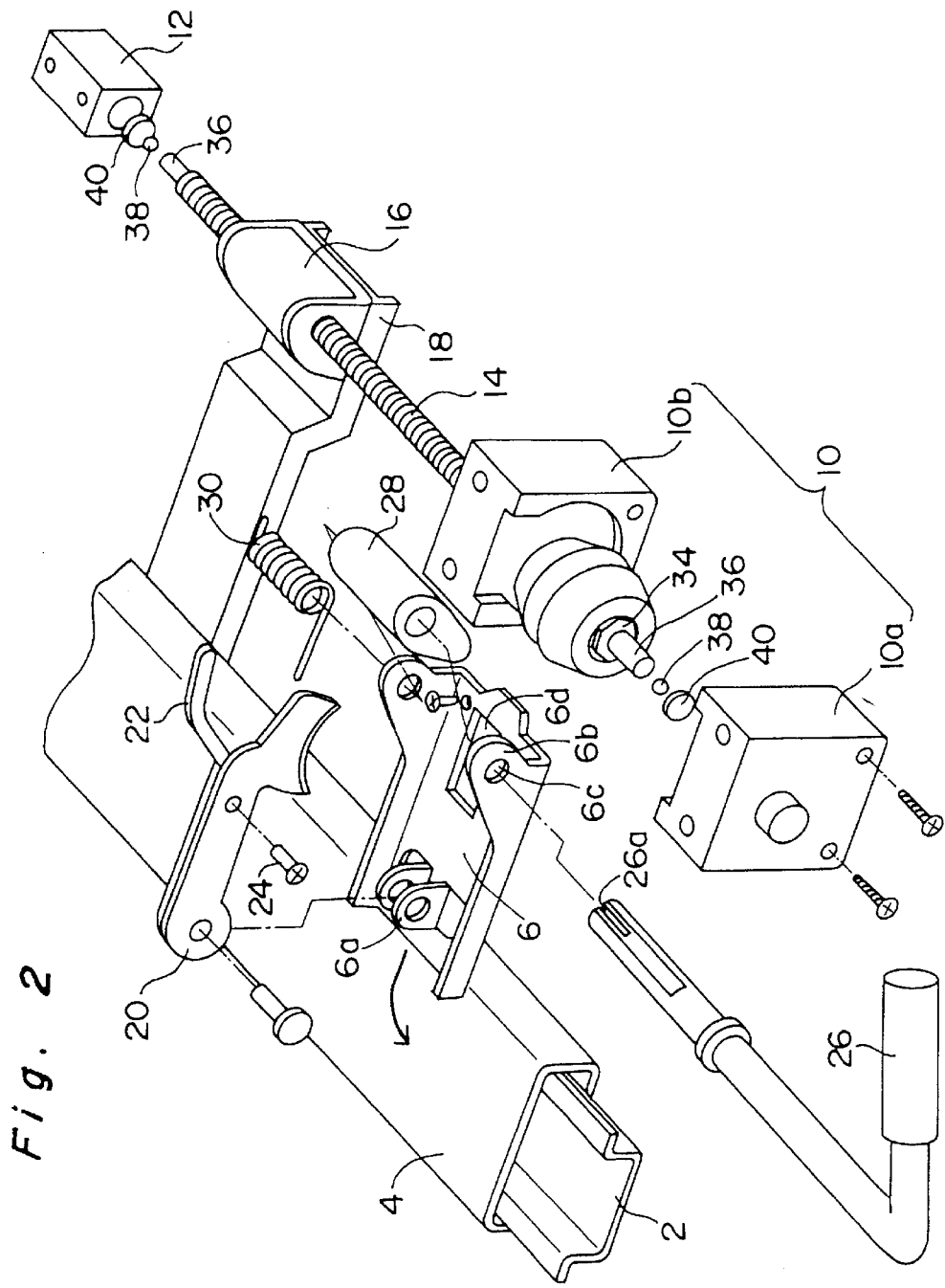
FIG. 2 is an exploded perspective view of the seat slide unit of FIG. 1.

FIGS. 1 and 2 depict a seat slide unit provided with a lock mechanism of the present invention for locking the seat slide unit. The seat slide unit is comprised of a pair of seat tracks mounted on respective sides of a vehicle body and a lock mechanism mounted on one of the seat tracks.

Each of the seat tracks is comprised of a lower rail 2 anchored to a floor of the vehicle body, and an upper rail 4 slidably mounted on the lower rail 2 so as to cover it from above. A seat (not shown) is fixed onto the upper rail 4.

An lever bracket 6 having a generally U-shaped section and a generally flat rear casing bracket 8 are secured to front and rear end portions of an upper surface of the upper rail 4. A front casing 10 and a rear casing 12 are secured to lower surfaces of portions, protruding in the widthwise direction of the vehicle body, of the lever bracket 6 and the rear casing bracket 8, respectively. The front and rear casings 10 and 12 rotatably support front and rear ends of a screw 14 extending in parallel with the upper rail 4. The screw 14 is in mesh with a nut 16 fixed to the lower rail 2 via a nut bracket 18. The screw 14 and the nut 16 are so selected as to have a lead angle greater than the angle of friction thereof. Because of this, when a load is applied from the seat to the screw 14 via the upper rail 4 in the axial direction of the screw 14, the screw 14 rotates so that the upper rail 4 together with the seat is moved relative to the lower rail 2 in a direction in which the load is applied.

The lever bracket 6 has vertical side walls opposed to each other and having respective holes 6c defined therein at end portions 6b thereof, while an operating lever 26 is pivotally inserted into these holes 6c. A cam 28 is mounted on and rigidly secured to the operating lever 26 so as to extend therethrough between the vertical side walls of the lever bracket 6 for rotation together with the operating lever 26. A lock spring 30 is wound around a rear end portion of the operating lever 26 and has one end in engagement with a groove 26a defined in the rear end portion of the operating lever 26 and the other end in engagement with an upper surface of the upper rail 4 so as to urge the operating lever 26 in the clockwise direction in FIG. 1.

The lever bracket 6 also has a pair of vertical support plates 6a formed by cutting and raising that portion of the lever bracket 6 which is located above the upper rail 4. The vertical support plates 6a pivotally support a lock plate 20 for locking a disk accommodated in the front casing 10 and an arm 22 for releasing engagement of the lock plate 20 with the disk by moving the lock plate 20 upwards. The disk is described later.

Figure 3:
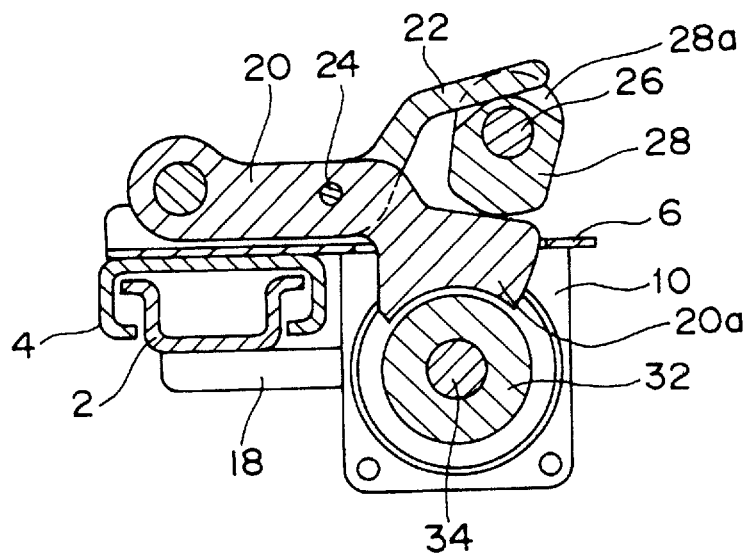
FIG. 3 is a vertical sectional view of an emergency lock means mounted in the seat slide unit of FIG. 1.

As shown in FIG. 3, the lock plate 20 and the arm 22 are fixed to each other at central portions thereof by means of a pin 24 so as to vertically move together. A free end portion of the arm 22 is bent upwards and loosely received in a slit 28a defined in the cam 28 on the upper surface thereof, while a free end portion of the lock plate 20 is bent downwards with the cam 28 interposed between the free end portion of the lock plate 20 and that of the arm 22. The lock plate 20 has a lower end 20a (engagement portion) of a generally V-shaped section extending downwards through an opening 6d defined in the lever bracket 6 for engagement with the disk.

Figure 4:
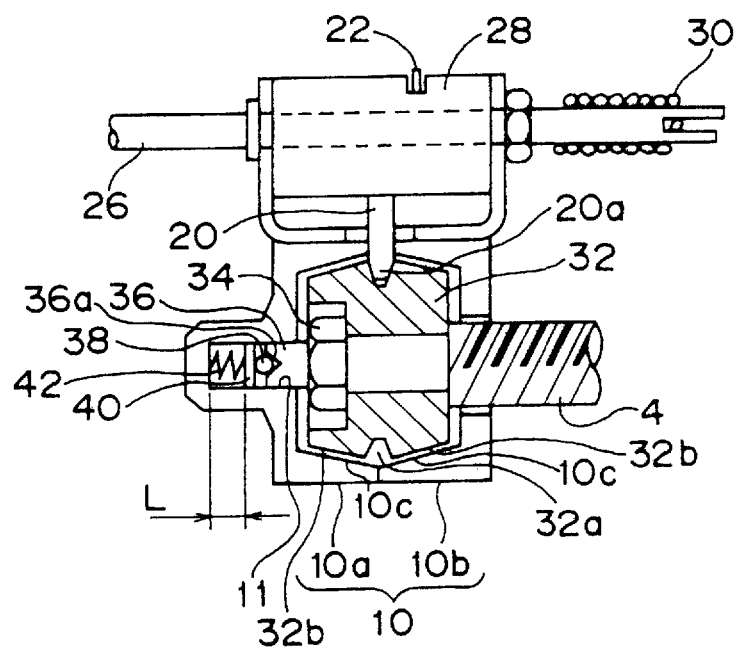
FIG. 4 is a front view, partially in section, of the emergency lock means shown of FIG. 3.

As shown in FIGS. 2 and 4, the front casing 10 is comprised of a pair of casing halves 10a and 10b, while a disk 32 fixed to the front end portion of the screw 14 by means of a bolt 34 is accommodated in the front casing 10. The disk 32 has an annular groove 32a defined therein at an axially central portion thereof and having a generally V-shaped section. The disk 32 also has front and rear inclined circumferential surfaces 32b on respective sides of the annular groove 32a. On the other hand, the casing halves 10a and 10b have respective inclined inner walls 10c confronting associated inclined circumferential surfaces 32b of the disk 32. Each of the inclined inner walls 10c of the casing halves 10a and 10b has a gradient equal to that of the associated one of the inclined circumferential surfaces 32b of the disk 32. The bolt 34 has a head to which a rod 36 is secured. This rod 36 is rotatably inserted into a recess 11 defined in the casing half 10a on a front portion thereof to rotatably support the screw 14. The rod 36 has a conical recess 36a defined therein on a front end surface thereof in which a ball 38, urged against the rod 36 via a disk-shaped plate 40 by an elastic means 42 such as, for example, a spring, is received.

Likewise, another rod 36 is secured to a rear end of the screw 14, and a ball 38 is urged against the rod 36 via a disk-shaped plate 40 by an elastic means 42.

The lock mechanism of the above-described construction operates as follows.

The operating lever 26 is always urged by the lock spring 30 in the clockwise direction in FIG. 1. When there is no need to adjust the position of the seat in a direction longitudinally of the vehicle body, the lock plate 20 is pressed downwards by the cam 28 in a manner as shown in FIG. 3. Consequently, the lower end 20a of the lock plate 20 is held in engagement with the annular groove 32a of the disk 32 to prevent rotation of the disk 32 and that of the screw 14, thereby locking the seat in the current position.

In the case where the position of the seat is required to be adjusted, when the operating lever 26 is operated in a counterclockwise direction in FIG. 1, the cam 28 is rotated in the same direction to cause the arm 22 to move upwards. Consequently, the lock plate 20 interlocked with the arm 22 is similarly moved upwards to disengage the lower end 20a of the lock plate 20 from the annular groove 32a of the disk 32. Under this condition, the inclined surfaces 32b of the disk 32 and the inclined inner walls 10c of the casing 10 are spaced a predetermined distance from each other and, hence, application of a load to the seat results in rotation of the screw 14, thereby allowing the position of the seat to be properly adjusted.

If a great deceleration or acceleration is applied to the lower rail 2 due to, for example, a vehicle collision or the like in a so-called lock-off state in which the operating lever 26 is being operated to adjust the position of the seat, a force is applied to the nut 16 so as to move the screw 14 axially against an elastic force of the elastic means 42 before the screw 14 rotates. Consequently, the disk 32 fixed to the screw 14 moves similarly and brings one of the inclined surfaces 32b of the disk 32 into frictional engagement with the corresponding inclined inner wall 10c of the front casing 10, thereby preventing rotation of the screw 14 and locking the seat in the current position. In other words, the disk 32 and the front casing 10 constitute an emergency lock means.

A proper selection of the elastic force of the elastic means 42 determines to a desired value the magnitude of deceleration and acceleration at which the inclined surfaces 32b of the disk 32 are brought into frictional engagement with the associated inclined inner walls 10c of the front casing 10.

As shown in FIG. 4, although the screw 14 is, in case of a vehicle collision, allowed to axially move within the range of a stroke L provided in the recess 11 of the casing half 10a (the rear casing 12 is constructed similarly), it is so designed that one of the inclined surfaces 32b of the disk 32 is brought into frictional engagement with associated one of the inclined inner walls 10c of the front casing 10 before the amount of movement of the screw 14 reaches the stroke L.

Figure 5:
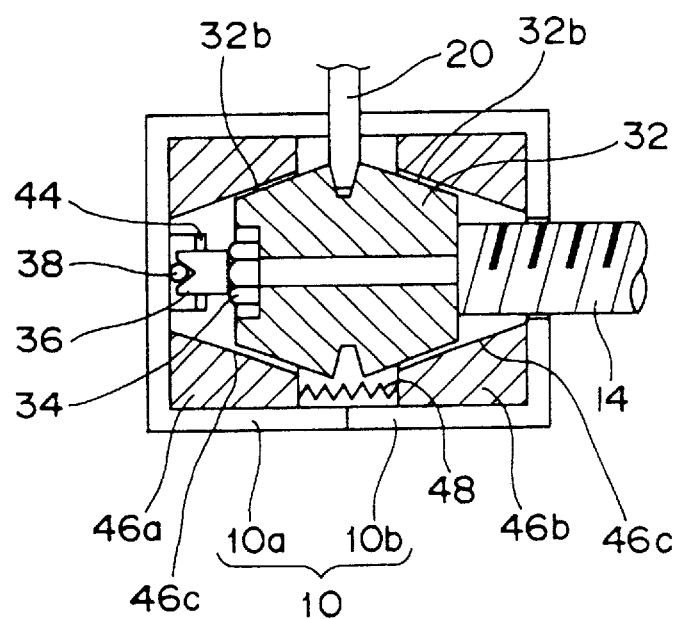
FIG. 5 is a front view, partially in section, of a modification of the emergency lock means.

FIG. 5 depicts a modification of the lock mechanism, wherein the rod 36 is rotatably supported by a rod support 44 secured to a front wall of the casing half 10a, and the ball 38 is held in contact with the front wall of the casing half 10a. Likewise, the rod 36 secured to the rear end of the screw 14 is rotatably supported by another rod support secured to a rear wall of the rear casing 12 and is held in contact with the rear wall of the rear casing 12 via a ball 38, so that the screw 14 is prevented from moving in the axial direction thereof.

In the example illustrated in FIG. 5, a pair of inertial lock members 46a and 46b are slidably accommodated within the front casing 10 and are spaced a predetermined distance from each other in the longitudinal direction of the screw 14. The inertial lock members 46a and 46b have respective inclined inner surfaces 46c confronting associated inclined surfaces 32b of the disk 32 in a spaced relationship. Each of the inclined inner surfaces 46c of the inertial lock members 46a and 46b has a gradient equal to that of associated one of the inclined surfaces 32b of the disk 32. These inertial lock members 46a and 46b are urged by an urging means 48 such as, for example, a spring in opposite directions in which they are separated apart from each other.

If a great deceleration or acceleration is applied due to, for example, a vehicle collision or the like in the lock-off state of the seat slide unit having the above-described lock mechanism, one of the inertial lock members 46a and 46b slides toward the disk 32, and the inclined inner surface 46c of the former is brought into frictional engagement with the inclined surface 32b of the latter to thereby prevent rotation of the disk 32 and that of the screw 14, thus locking the seat in the current position. In other words, the disk 32 and the inertial lock members 46a and 46b constitute an emergency lock means. The magnitude of deceleration and acceleration at which the disk 32 and the inertial lock members 46a and 46b are brought into frictional engagement with each other can be varied by properly selecting the urging means 48.

Because the lock mechanism of the construction shown in FIG. 5 operates in the same manner as that of the previous embodiment under the normal condition, description thereof is omitted for brevity's sake.

Figure 6:
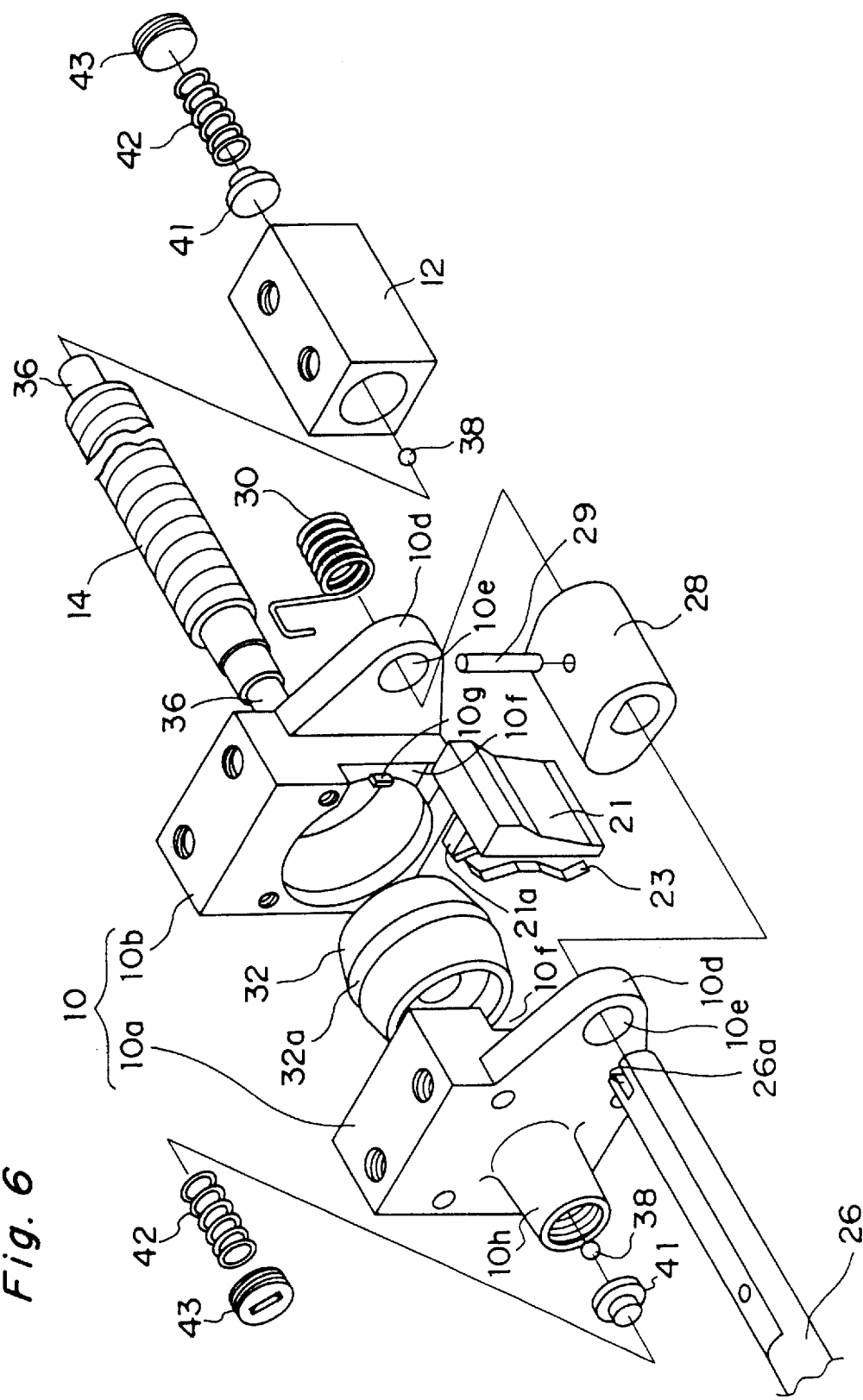
FIG. 6 is an exploded perspective view of another modification of the emergency lock means.

FIG. 6 depicts another modification of the lock mechanism, wherein the magnitude of the inertial force at which the emergency lock means operates can be easily adjusted from outside.

As shown in FIG. 6, a pair of casing halves 10a and 10b have respective lever brackets 10d integrally formed therewith and having respective lever receiving holes 10e defined therein. An operating lever 26 is rotatably inserted into the lever receiving holes 10e, while a cam 28 is rigidly secured to the operating lever 26 between the lever brackets 10d by means of a pin 29 for rotation together with the operating lever 26. A lock spring 30 is wound around a rear end portion of the operating lever 26 and has one end in engagement with a groove 26a defined in the rear end portion of the operating lever 26 and the other end in engagement with an upper surface of the lever bracket 10d of the casing half 10b, so that the lock spring 30 may urge the operating lever 26 in the clockwise direction in FIG. 6.

The pair of casing halves 10a and 10b have respective side walls confronting the cam 28 and having respective cutouts 10f defined therein, while a vertically arranged lock member 21 is slidably housed in the cutouts 10f and is pressed against the disk 32 by the cam 28. The lock member 21 is urged towards the cam 28 by means of two generally W-shaped springs 23 (only one spring is illustrated in FIG. 6), the centers of which are carried by associated projections 10g formed in the cutouts 10f, and upper and lower ends of which are held in contact with the inner surface of the lock member 21.

The lock member 21 has an engagement portion 21a protruding laterally from an inner surface thereof and extending vertically at a central portion thereof so as to be engageable with the annular groove 32a of the disk 32. To this end, the engagement portion 21a of the lock member 21 is of a shape identical to that of the engagement portion 20a shown in FIGS. 3 and 4. As a matter of course, engagement of the engagement portion 21a of the lock member 21 with the annular groove 32a of the disk 32 results in locking of the screw 14.

The casing half 10a has an internally threaded cylindrical storage portion 10h protruding forwards therefrom in which are stored a ball 38 received in the conical recess 36a (refer to FIG. 4) of the rod 36, a disk-shaped plate 41 and a spring 42, while a slotted set screw 43 is threaded into an open end of the cylindrical storage portion 10h.

On the other hand, a rear end of the screw 14 is accommodated in the rear casing 12, in which a ball 38 is urged against a rod 36, secured to the rear end of the screw 14, via a disk-shaped plate 41 by means of a spring 42, while a slotted set screw 43 is threaded into an open rear end of the rear casing 12, as similar to the front casing 10.

Because the other components of the lock mechanism shown in FIG. 6 are constructed similarly to those shown in FIGS. 1 through 4, description thereof is omitted for brevity's sake.

The lock mechanism of the above-described construction operates as follows.

The operating lever 26 is urged by the lock spring 30 in the clockwise direction in FIG. 6. When there is no need to adjust the position of the seat, the lock member 21 is pressed by the cam 28 to engage the engagement portion 21a of the lock member 21 with the annular groove 32a of the disk 32, thereby preventing rotation of the disk 32 and that of the screw 14 to lock the seat in the current position.

When the operating lever 26 is operated in the counter-clockwise direction in FIG. 6 in order to adjust the position of the seat, the cam 28 pivots together with the operating lever 26 and, at the same time, the lock member 21 is moved towards the cam 28 by the urging force of the springs 23. Consequently, the engagement of the engagement portion 21a of the lock member 21 with the annular groove 32a of the disk 32 is released. Under this condition, the inclined surfaces 32b of the disk 32 and the inclined inner walls 10c of the front casing 10 are separated a predetermined distance apart from each other. Therefore, when a load is applied to the seat in the longitudinal direction of the vehicle body, the screw 14 rotates, thereby enabling adjustment of the position of the seat.

The operation in the case where a great deceleration or acceleration is applied to the lower rail 2 due to, for example, a vehicle collision during operation of the operating lever 26 in the lock-off state is the same as that of the embodiment shown in FIGS. 1 through 4 and, therefore, description thereof is omitted.

In the embodiment shown in FIGS. 1 through 5, the magnitude of the inertial force at which the emergency lock means operates is made adjustable by properly selecting the elastic force of the elastic means 42 or the urging force of the urging means 48, whereas in the construction shown in FIG. 6, such magnitude can be easily adjusted from outside by properly adjusting the length of the slotted set screw 43 threaded into the cylindrical storage portion 10h or the rear casing 12 without changing the spring 42.

Figure 7:
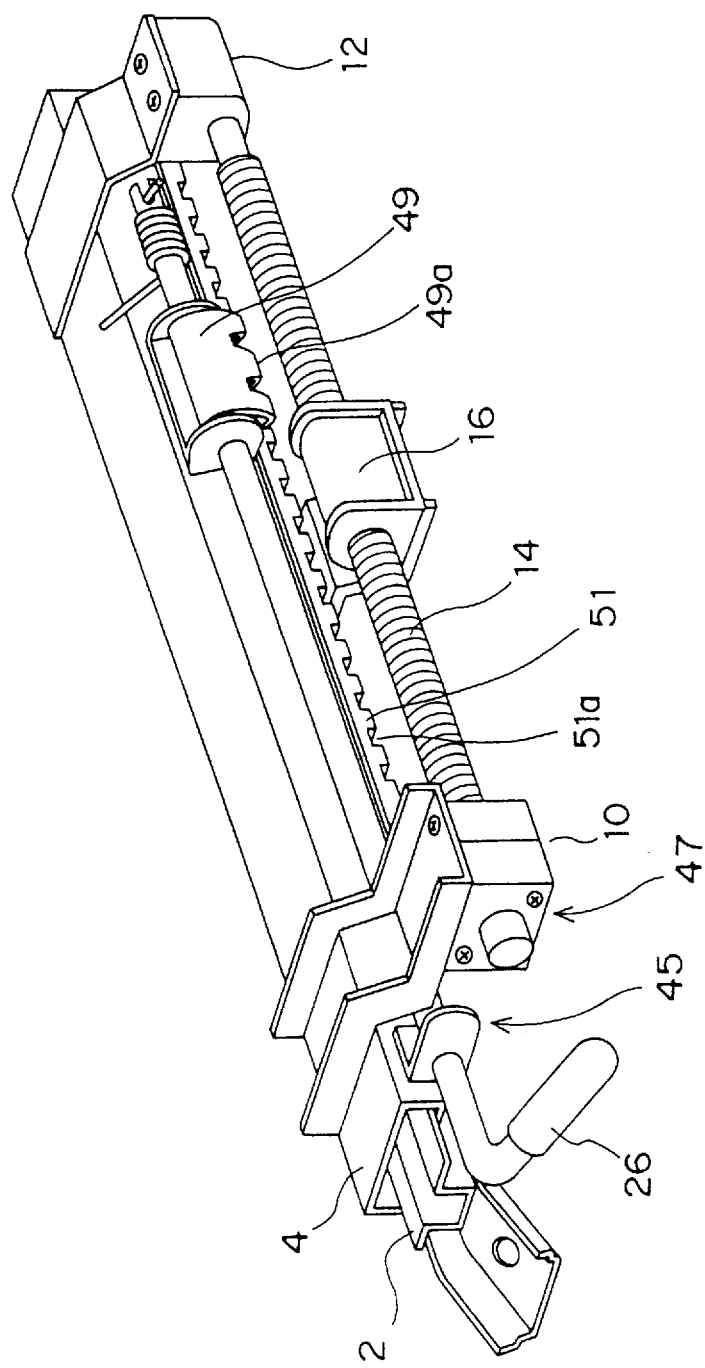
FIG. 7 is a perspective view of a seat slide unit provided with a lock mechanism according second embodiment of the present invention.

FIG. 7 depicts a lock mechanism according to a second embodiment of the present invention, which comprises a well-known manual lock means 45 and an emergency lock means 47 juxtaposed with each other.

The manual lock means 45 comprises an operating lever 26, a lock member 49 fixedly mounted on the operating lever 26 for rotation together therewith and having at least one pawl 49a, and a latch plate 51 secured to the lower rail 2 and having a plurality of latches 51a defined therein for engagement with the pawl 49a of the lock member 49. Seat locking is achieved by engaging the pawl 49a of the lock member 49 with any one of the plurality of latches 51a of the latch plate 51.

Figure 8:
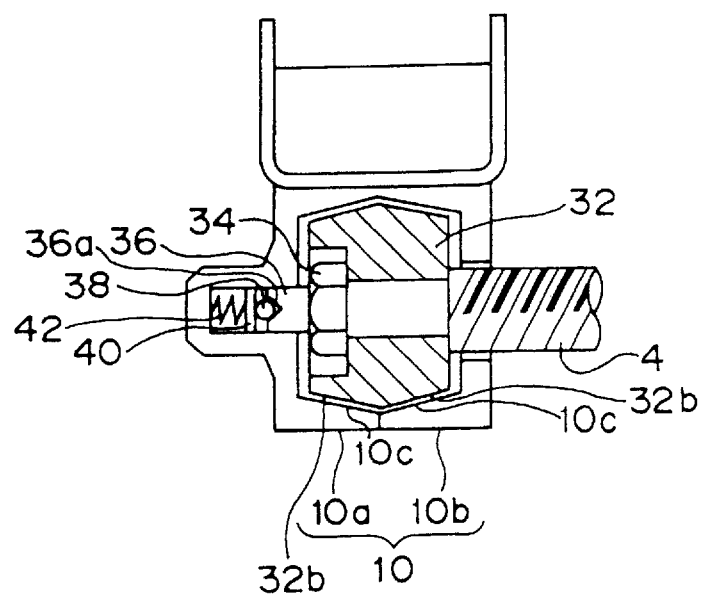
FIG. 8 is a front view, partially in section, of an emergency lock means mounted in the seat slide unit of FIG. 7.

On the other hand, the emergency lock means 47 is constructed by removing manually-operating components from the construction shown in FIG. 1 and comprises a screw 14 extending in parallel with the operating lever 26, front and rear casings 10 and 12 rotatably supporting front and rear ends of the screw 14, respectively, and a nut 16 meshed with the screw 14. As shown in FIG. 8, the front casing 10 accommodates a disk 32 having no annular groove. If deceleration or acceleration of a value not smaller than a given value is applied to the lower rail 2 due to a vehicle collision or the like in the lock-off state in which the manual lock means 45 is released, one of inclined front and rear surfaces 32b of the disk 32 is brought into frictional engagement with associated one of inclined inner walls 10c of the front casing 10, to thereby lock the seat.

Figure 9:
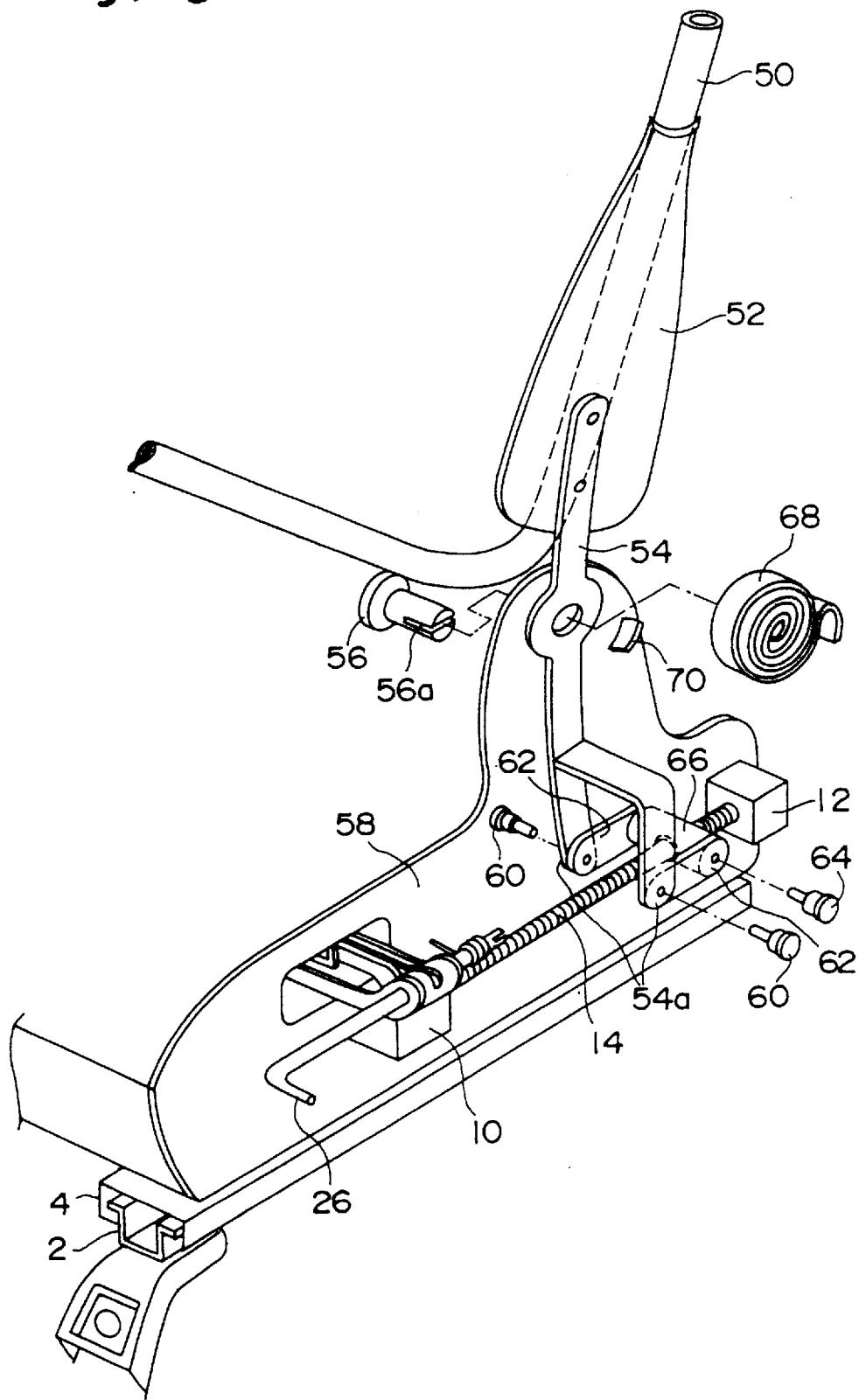
FIG. 9 is a fragmentary perspective view of a seat reclining unit provided with a lock mechanism according to a third embodiment of the present invention.

FIG. 9 depicts a lock mechanism according to a third embodiment of the present invention, and in the illustrated example the lock mechanism is applied to a seat reclining unit.

As shown in FIG. 9, one end of a swinging or tilting arm 54, pivotally mounted on a seat cushion frame 58 by a pin 56, is secured to a bracket 52 fixedly mounted on a seat back frame 50. The other end of the tilting arm 54 is formed with a pair of generally parallel leg portions 54a, each of which is pivotally connected to one end of an arm plate 62 via a pin 60. The other end of the arm plate 62 is pivotally connected to a nut 66 via a pin 64. Because the nut 66 is in mesh with the screw 14 shown in FIGS. 1 or 5, the angle of inclination of the seat back frame 50 is maintained unchanged unless the operating lever 26 is operated.

The pin 56 has a groove 56a defined therein on a distal end thereof, while a coil spring 68 has one end in engagement with the groove 56a and the other end in engagement with a projection 70 formed on the seat cushion frame 58 so as to urge the seat back frame 50 forwards.

Although the lock mechanism shown in FIGS. 1 or 5 includes a nut 16 securely mounted on the lower frame 2 via a nut bracket 18, the nut 66 is slidably mounted on the screw 14. Except for this point, the other construction is identical and, therefore, no description is made therefor.

The seat reclining unit shown in FIG. 9 operates as follows.

When adjustment of the angle of inclination of the seat back is desired, the operating lever 26 is first operated to disengage the lock plate 20 from the disk 32. A subsequent movement of the upper part of the body of a person sitting on the seat results in tilting of the seat back. By releasing the operating lever 26 at a desired position, the urging force of the lock spring 30 acts to engage the engagement portion 20a of the lock plate 20 with the annular groove 32a of the disk 32, thereby locking the disk 32 to hold the seat back at such a desired position.

If a great deceleration or acceleration is applied to the lower rail 2 due to, for example, a rear-end collision in the so-called lock-off state in which the engagement of the lock plate 20 with the disk 32 is released, the upper part of the body of the person is abruptly inclined rearwardly and applies a load to the seat back. At the same time, the seat back pivots about the pin 56 and applies a forwardly-directed force to the nut 66. Consequently, the screw 14 is pressed forwards, bringing the front inclined surface 32b of the disk 32 into frictional contact with associated one of the inclined inner walls 10c of the front casing 10. As a result, the disk 32 is locked to hold the seat back at a current angle of inclination.

As is clear from the above, according to the present invention, because the lead angle of the screw and the nut in mesh with each other are made to be greater than the angle of friction thereof, when a load is applied to the seat or the seat back in the lock-off state, the screw rotates to allow the position of the seat or the angle of inclination of the seat back to be adjusted. Furthermore, when deceleration or acceleration of a value not smaller than a given value is accidentally applied to the seat, the disk and the screw are locked, thus preventing an abrupt sliding movement of the seat or an abrupt pivoting movement of the seat back.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A lock mechanism for locking a seat reclining unit mounted on a vehicle seat having a seat cushion frame and a seat back frame, said seat reclining unit having a first member to be secured to the seat back frame, said vehicle seat being fixedly mounted on a second member to be slidably mounted on a vehicle body, said lock mechanism comprising:

a screw rotatably mounted on said second member and extending in parallel therewith said screw being axially movable relative to said second member when deceleration or acceleration of a value not smaller than a predetermined value is applied to the vehicle seat and to said second member;

an arm pivotally mounted on said seat cushion frame and having first and second ends opposite to each other, the first end of said arm being secured to said first member;

a nut mounted on the second end of said arm and being in mesh with said screw, each of said screw and said nut having a lead angle greater than an angle of friction thereof so that said screw rotates in response to a load applied to said first member, to thereby allow said first member to move relative to said second member; and an emergency lock means for locking said screw in response to deceleration or acceleration of a value not smaller than a predetermined value applied to said vehicle seat.

2. The lock mechanism according to claim 1, and further comprising first and second casings secured to said second member for rotatably supporting first and second ends of said screw, respectively, wherein said emergency lock means comprises said first casing and a disk secured to the first end of said screw and rotatably accommodated in said first casing, each of said first and second casings having a space defied therein to allow said screw to move in a direction axially thereof, said first casing having inner walls with one of which said disk is brought into frictional contact upon application of said deceleration or acceleration, to thereby lock said screw.

3. The lock mechanism according to claim 2, and further comprising an elastic means accommodated in said space, wherein said predetermined value can be changed by adjusting an elastic force of said elastic means from outside.

4. The lock mechanism according to claim 2, and further comprising a lock member pivotally mounted on said second member, an operating lever pivotally mounted on said second member, and a cam securely mounted on said operating lever for rotation together therewith, whereby operation of said operating lever causes said cam to press said lock member against said disk to thereby lock said screw.

5. The lock mechanism according to claim 1, further comprising first and second casings secured to said second member for rotatably supporting first and second ends of said screw, respectively, wherein said emergency lock means comprises a pair of inertial lock members slidably accommodated within said first casing and a disk secured to the first end of said screw and rotatably accommodated in said first casing, said disk confronting said pair of inertial lock members and spaced therefrom so that said disk is brought into frictional contact with one of said pair of inertial lock members upon application of said deceleration or acceleration, to thereby lock said screw.

6. The lock mechanism according to claim 5, and further comprising a lock member pivotally mounted on said second member, an operating lever pivotally mounted on said second member, and a cam securely mounted on said operating lever for rotation together therewith, whereby operation of said operating lever causes said cam to press said lock member against said disk to thereby lock said screw.

\* \* \* \* \*